Oct. 6, 1925.
D. R. BAILEY
1,556,472
APPARATUS FOR COATING FOOD PRODUCTS
Filed Aug. 19, 1924     2 Sheets-Sheet 1
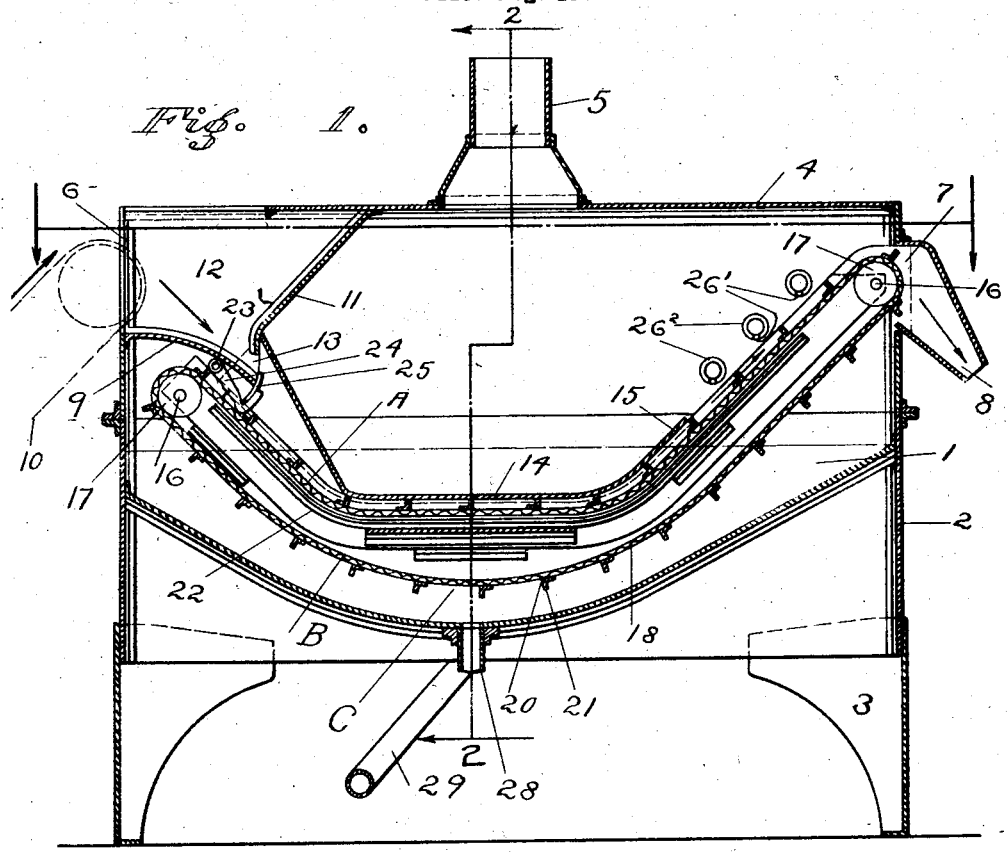
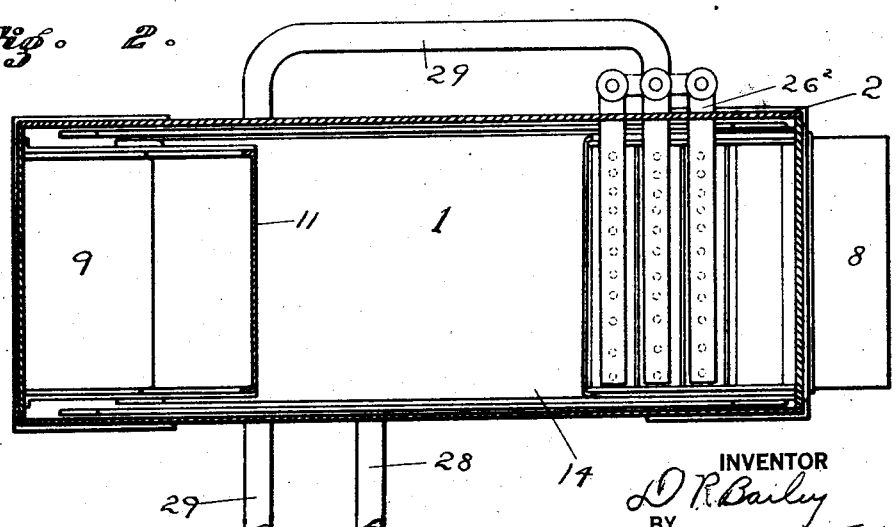
INVENTOR
D. R. Bailey
BY
Harry H. Totten
ATTORNEY

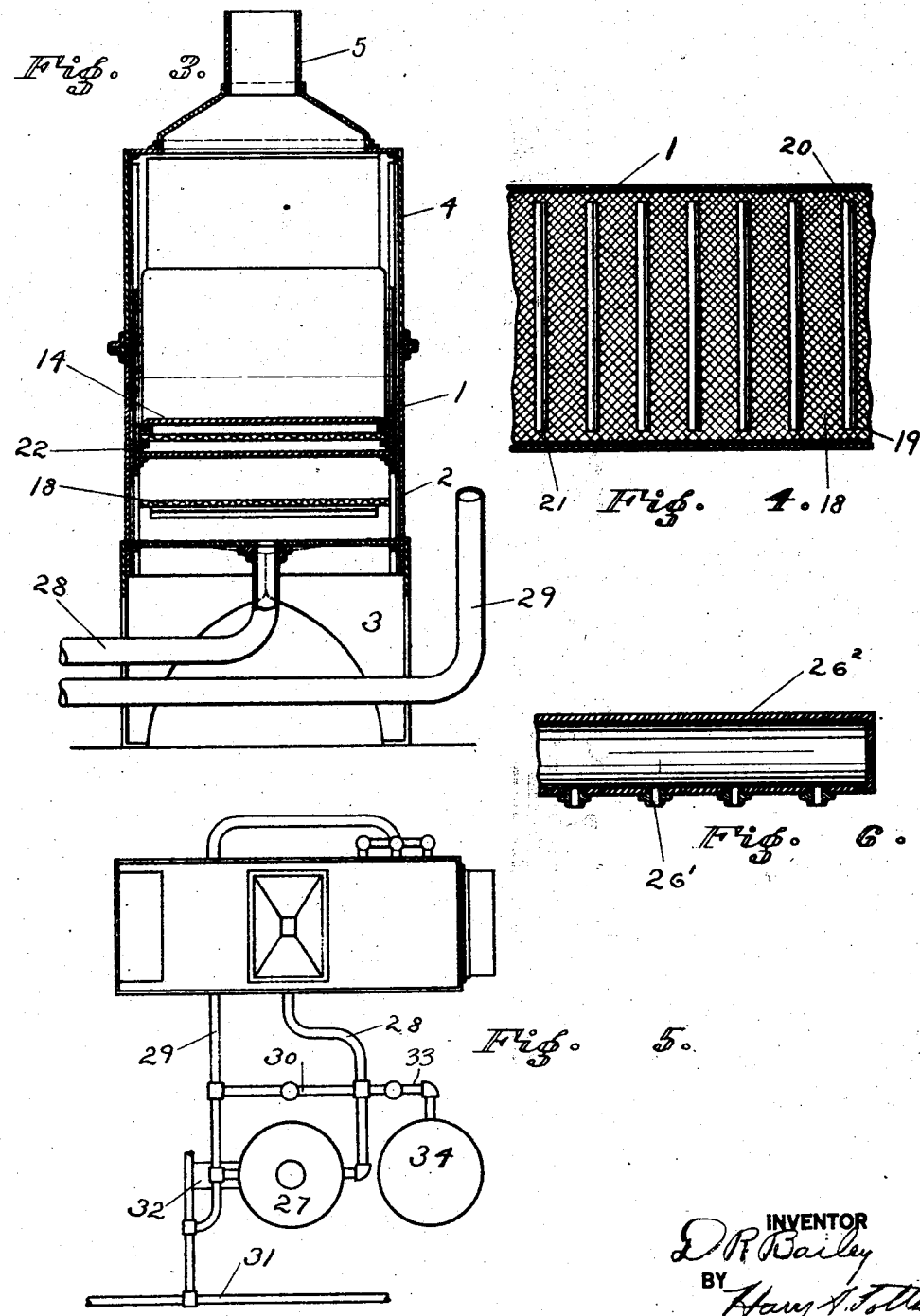

Patented Oct. 6, 1925.

1,556,472

UNITED STATES PATENT OFFICE.

DAVID R. BAILEY, OF SACRAMENTO, CALIFORNIA, ASSIGNOR TO CALIFORNIA ALMOND GROWERS EXCHANGE, OF SAN FRANCISCO, CALIFORNIA, A CORPORATION OF CALIFORNIA.

APPARATUS FOR COATING FOOD PRODUCTS.

Application filed August 19, 1924. Serial No. 738,015.

*To all whom it may concern:*

Be it known that I, DAVID R. BAILEY, a citizen of the United States, residing at Sacramento, in the county of Sacramento and State of California, have invented certain new and useful Improvements in Apparatus for Coating Food Products, of which the following is a specification.

The present invention relates to an apparatus through which food products such as nut meats, for example, almonds, or potato chips, are conveyed, and wherein they receive a coating for assisting salt or granular material applied thereon to adhere thereto.

It has been discovered that if the granular material applied to almonds and other nut meats or potato chips is caused to adhere, that a considerable saving in the amount of granular material employed is made, due to the fact that the granular material when once applied is not easily displaced therefrom and it has been to accomplish this end that the present apparatus has been designed.

The principal object of the invention is to provide an apparatus wherein the product to be treated is conveyed in a continuous stream flow through a spray of material directed thereon to adhere thereto, preferably liquid, and wherein the excess liquid applied during the subjection to the spraying action drains from the material, is reheated, recirculated and again discharged onto other material in spray formation; a further object is to provide valve controlled spray pipes discharging on the material as conveyed whereby a greater or lesser amount of adhesive may be applied to the material as conveyed; another object is to provide an apparatus adapted for the spraying of blanched and cooked nut meats with a coating of vegetable adhesive which will assist in maintaining the subsequently applied salt adhering to the surface thereof.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings forming a part of this application and wherein—

Fig. 1 is a view in vertical longitudinal section of the preferred embodiment of my apparatus.

Fig. 2 is a transverse vertical section taken on line 2—2 of Fig. 1, viewed in the direction of the arrow.

Fig. 3 is a view in detailed plan of a portion of the mesh conveyor.

Fig. 4 is a view in top plan of the apparatus with the fluid heating and circulating boiler connected therewith.

Fig. 5 is a view in diagrammatic plan, disclosing the preferred layout of the apparatus.

Fig. 6 is a detail, longitudinal, sectional view of a portion of one of the spray pipes.

In the drawings wherein like characters of reference designate corresponding parts, the numeral 1 indicates a suitable chamber substantially rectangular in plan and consisting of a body portion 2 supported by legs 3 and a removable cover portion 4 upwardly from which extends a stack or vent 5. The apparatus is provided in the removable cover 4 with a material feed opening 6 and a material discharge opening 7, the latter communicating with the discharge chute 8. A substantially horizontally downwardly curved wall 9 affords a support for the product delivered through the opening 6 by the endless conveyor 10 or other suitable means and a wall 11 disposed transversely of the chamber 1 at a point inwardly from the opening 6 provides a stop wall for the material, the wall 11 being disposed angularly to the wall 9 and the two being arranged with their adjacent ends in spaced relation whereby the walls 9 and 11 provide a storage hopper 12 formed with a discharge throat 13. Disposed transversely of the chamber 1 and extending from a point commencing at the end of the plate 11 and terminating at a point short of the lower wall of chute 8 is conveyor guide plate 14, a portion of which is disposed substantially horizontally in the chamber, the rear end of which is inclined upwardly as at 15 to extend a short distance at an upward inclination.

Within the chamber are disposed the transverse rotatably mounted shafts 16 carrying the respective conveyor mounting and operating rollers 17, one being positioned beneath the plate 9 and the other adjacent the center of the discharge opening 7. Operating over the conveyor supporting rollers 17 is an endless conveyor 18 preferably of open mesh wire cloth, the strands of which intersect as at 19. The rollers 17 divide the conveyor into upper and lower flights A and B and the outer surface of the conveyor carries at spaced points thereon the transversely disposed angle irons 20. The portions 21 of the respective angle irons are disposed at right angles to the outer face of the conveyor, affording between adjacent irons pockets C disposed throughout the entire area of the conveyor. The side walls of the chamber 1 mount suitable tracks 22 disposed beneath the conveyor guide plate 14 and extending in a curved path following substantially the curvature of the plate 9 and plate 14 between conveyor rolls 17. These guide tracks preclude undue sagging of the upper flight A of the conveyor in its movement from the feed to the discharge end of the apparatus. Fulcrumed on a horizontal axis 23 at a point between one of the rollers 17 and the under surface of the plate 9 are the arms 24 carrying at their free ends a plate 25 serving as a gate to control the passage of material onto the conveyor through the throat 13. It will be observed that the portions 21 of the angle irons 20 in passing beneath the arms 24, act on the same to cause an upward movement of the plate 25 to permit an intermittent flow of material onto the conveyor 18 through the throat 13. It will be observed that the angle irons 20 are positioned a sufficient distance apart on the conveyor to admit of the arms 24 dropping by gravity to move the plate 25 from closed position in the throat prior to the arms being again raised to move the plate into closed position in the throat.

Power is applied to the shaft 16 adjacent the discharge opening 7 to operate the conveyor in the direction of the arrow and it will be observed that as the conveyor moves toward the discharge opening of the apparatus that successive charges of material will be admitted into successive pockets C by the timed opening and closing of the throat 13. The conveyor in its movement with the product to be treated contained within the pockets, passes beneath the guide plate 14 with the free edges of the portions 21 of the angle irons 20 in contact with the under surface of the plate 14, which forms a closure for the otherwise open tops of the pockets and which plate also controls the path of travel of the upper flight of the conveyor. The fluid such as gum arabic for spraying onto the conveyed material is preferably applied to the continuous stream of nut meats by being discharged through the spray nozzles 26' of spray pipes $26^2$ disposed transversely across the upper flight A of the conveyor at a point above the end 15 of plate 14. Spray pipes connect through valve controlled couplings with a circulating pipe 29, and a pipe 28 leads from the chamber to return the coating material collecting therein, as the excess drains from the nuts to a hereinafter described boiler for reheating and recirculating the same. The gum arabic is maintained at the desired temperature by a suitable boiler 27 connected with the chamber through the circulating pipes 28 and 29, which are in turn connected in advance of the boiler through a valve controlled pipe 30. Fuel is supplied to the boiler through the pipe 31 and its flow to control the temperature of the boiler is regulated by a thermostatic valve 32, the operation of which is governed by the temperature of the fluid in the return pipe 28 at a point near the boiler 27. With the pipe 29 is connected through a valve controlled pipe 33 a fluid storage reservoir 34 from which fluid is adapted to be admitted into a circulating system as the same evaporates or is absorbed by the food under treatment.

It will be observed that the application of gum arabic, a vegetable adhesive to the surface of foods, to assist in maintaining a granular coating thereto, does not in any manner render the food injurious to human consumption, but on the other hand provides a sealing medium for the food which assists in retaining the food value within the article, prevents evaporation and deters deterioration.

In addition to the present apparatus it is believed new to apply by spraying onto the surface of nut meats and the like a vegetable non-injurious coating in the form of an adhesive which will assist in retaining salt or other granular particles of material to the surface of the food when applied thereto, thus affording a saving in the amount of granular material employed, occasioned by the fact that the material when once applied is retained to the surface of the article by the adhesive.

I claim:

1. The method of retaining a granular substance to the surface of nut meats and the like, which consists in first coating the surface of the material with a vegetable gum.

2. The method of retaining a granular substance to the surface of nut meats and the like, which consists in first applying to the surface of the material a coating of hot gum arabic.

3. The method of retaining a granular substance on the surface of nut meats and the like which consists in first spraying onto the surface of the material hot gum arabic.

4. The method of applying an adhesive medium to the surface of nut meats and the like, which consists in spraying under pressure gum arabic in a heated condition onto the material as the same is maintained in motion and permitting the excess to drain therefrom.

In testimony whereof I have signed my name to this specification.

DAVID R. BAILEY.